Jan. 24, 1939.         G. QUAYLE         2,145,093
                       SKID PLATFORM
              Filed Feb. 12, 1938      2 Sheets-Sheet 1
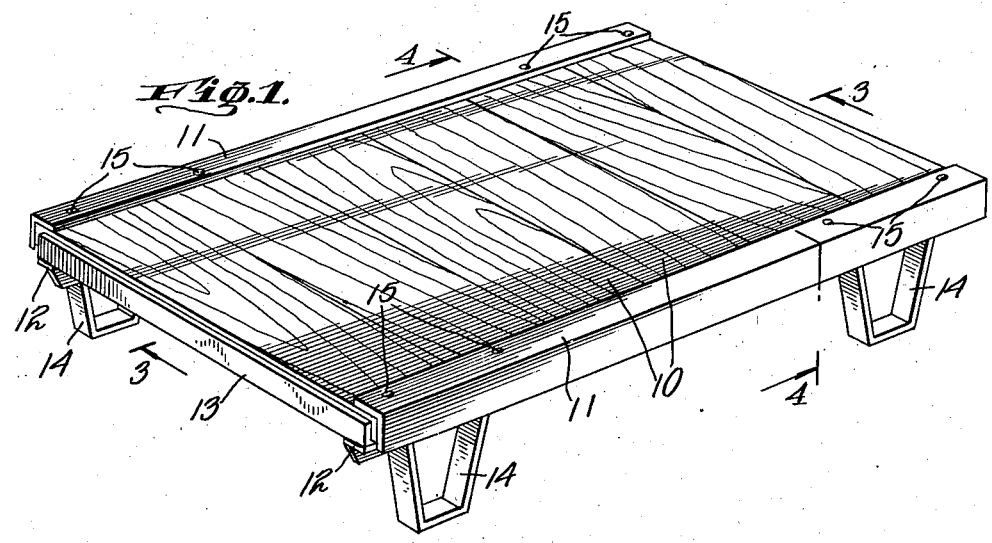
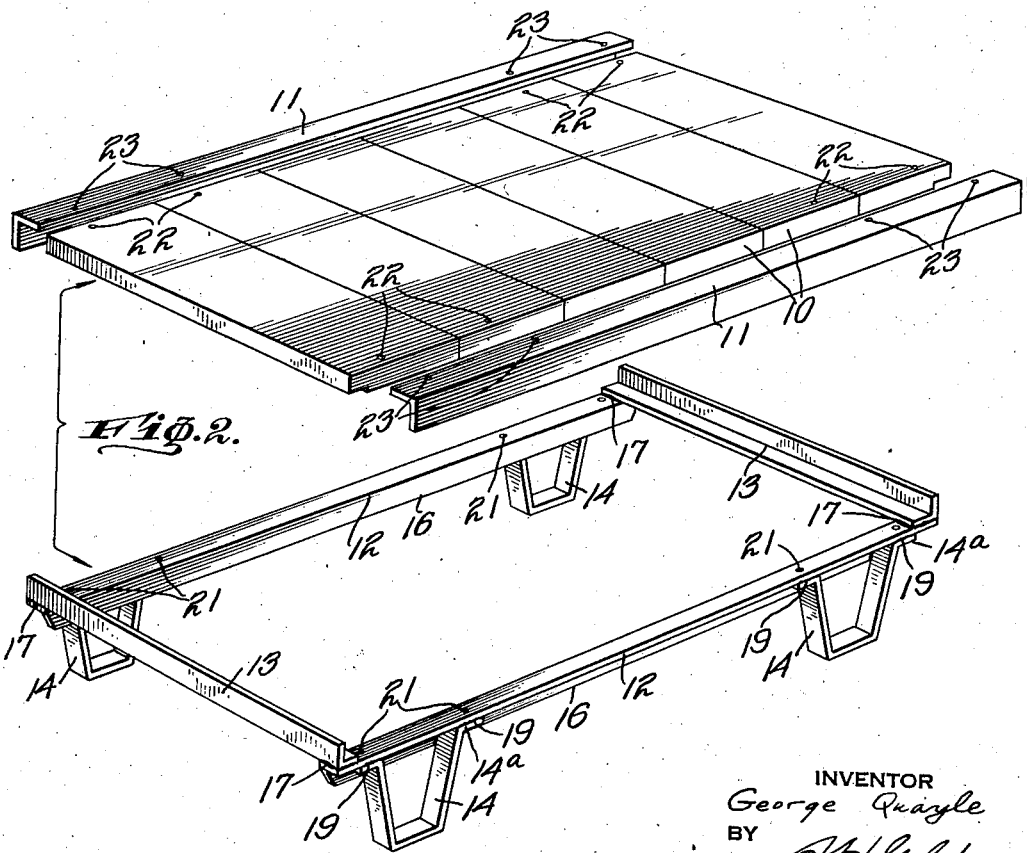
INVENTOR
George Quayle
BY
J. H. Golden
ATTORNEY Jan. 24, 1939.  G. QUAYLE  2,145,093
SKID PLATFORM
Filed Feb. 12, 1938  2 Sheets-Sheet 2
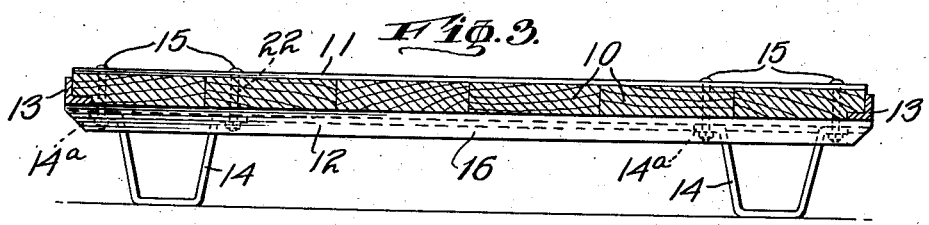
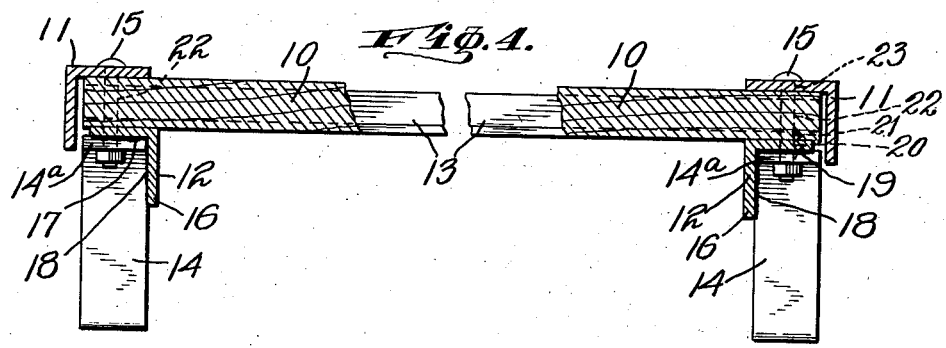
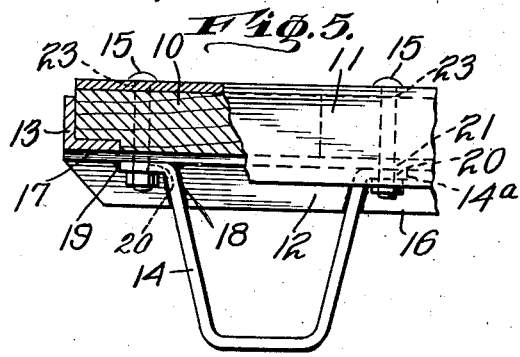 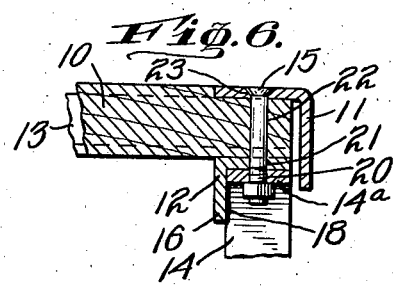
INVENTOR
George Quayle
BY
A. H. Golden
ATTORNEY Patented Jan. 24, 1939

2,145,093

UNITED STATES PATENT OFFICE 2,145,093

SKID PLATFORM

George Quayle, Philadelphia, Pa., assignor to The Yale & Towne Manufacturing Company, Stamford, Conn., a corporation of Connecticut Application February 12, 1938, Serial No. 190,305

2 Claims. (Cl. 248—120)

This invention relates to skid platforms of the type cooperable with industrial lift trucks.

The skid platform disclosed by me is an improvement over a skid of the type disclosed in the Stuebing Patent No. 1,575,462, and in the later Stuebing Patent No. 1,836,885, the form of skid contributed by me having all the advantages of the skid platforms shown in both Stuebing patents.

In the earlier Stuebing patent there is shown a skid platform in which a series of floor boards are united by bolts to edge binding upper and lower angle irons and to a series of legs. Such platforms as are disclosed by Stuebing in that patent are extremely satisfactory. In the later Stuebing patent, which was the first to disclose to the art an all-welded skid platform, the floor boards are held assembled to upper and lower angle irons which are welded in clamping relation to the edges of the floor boards. The end angle irons and the legs are then welded in proper relation to the welded angle irons. While this type of platform has many advantages over the bolted type of platform disclosed and claimed in the earlier Stuebing patent, it is somewhat unsatisfactory in that it does not permit ready replacement of the floor boards when worn, because the floor boards are held by the welded angle irons which cannot readily be separated when once welded.

In addition, the type of platform disclosed in the later Stuebing patent does not have the feature of the bolts assisting in the joining of the legs to the upper and lower angle irons which bind the edges of the floor boards. Also, the all-welded skid platform does not lend itself to the use of legs having horizontal supporting portions, to the same degree as does the earlier form of bolted platform.

The skid platform which I have conceived and developed, while having all the advantages pointed out as inherent in a bolted skid platform, has also all the advantages of the all-welded skid platform. My new skid also makes it possible to effect certain manufacturing economies, especially in the painting operation, all as will be described below.

For a detailed description of my invention, I shall now refer to the drawings wherein Fig. 1 is a perspective view of the skid platform of my invention. Fig. 2 is an exploded view showing the all-welded feature of my skid platform, the floor boards and the upper angle members which are superimposed over the floor boards. Fig. 3 is a section along lines 3—3 of Fig. 1, while Fig. 4 is a section along lines 4—4 of Fig. 1. Fig. 5 is a partial section and elevation showing the manner in which the legs of my skid platform are secured to the lower angle irons. Fig. 6 is a modified form of my invention taken along lines similar to that of Fig. 4, but showing the upper angle irons flush with the floor boards.

As shown in Fig. 1, my skid platform comprises a series of flood boards 10, the ends of which are bound by upper angle irons 11 and lower angle irons 12. The ends of the finished skid are armored with angle irons 13 which are supported by the horizontal flanges of the angle irons 12, and secured thereto by welding, as will be indicated below. A series of legs 14 are secured to the lower angle irons 12 by welding, as will be described shortly, and also by a series of bolts 15, all as will be explained presently.

Referring now more especially to Fig. 2, the lower angle irons 12 are preferably arranged with their vertical flanges 16 inwardly of the skid and depending downwardly. Supported on the horizontal flanges of angle irons 12 are the end reinforcing angle irons 13 which are welded in place as indicated by reference numeral 17. The legs 14 are then welded at 18 (Figs. 4 and 5) to the vertical flanges 16 of the angle irons 12, and at 19 to the horizontal flanges of the angle irons 12. The horizontal leg extensions 14a are drilled at 20 (Fig. 4), and the horizontal flanges of the angle irons 12 are drilled at 21 in alignment with the holes 20, so that the bolts 15 may be inserted through the aligned holes, as will be described presently.

It is at this point in the process of manufacture that the metal skid frame shown in the lower portion of Fig. 2 is painted. Since the welding just described has already been completed, the painting will not be injured by later welding. Since no wood is in place, a neat job may be done quickly and easily. To appreciate the advantages of all this, one must consider that in the prior art all-welded skid platform of Stuebing supra, the welding must be done after the wood boards are in place. If the frame is painted before welding, the welding then must injure the point, requiring a touch-up operation. If the painting is done after the welding operation and when the wood floor members are in place, then the painting must be rather painstaking to avoid covering parts of the wood floor. The painting of the wood floor together with the frame is undesirable, and of course quite expensive, since the paint soaks into the wood pores. It is thus seen that my invention simplifies greatly the manufacturing process at least as to the painting operation.

The floor boards 10 are then placed on the horizontal flanges of angle irons 12 so as to rest thereon, the boards being drilled as at 22, and the holes 22 being aligned with the holes 21 and the holes 20. The upper angle irons 11 are then placed over the ends of the boards, as is probably best illustrated in Figs. 1, 4 and 5, the said upper angle irons 11 having a series of holes 23 which are in alignment with the holes 22, 21 and 20 already described. Therefore, when the upper angle irons 11 are set in place, the bolts 15 may be inserted through aligned holes 23, 22, 21 and 20 for maintaining in assembled relation the upper angle irons 11, the boards 10, the lower angle irons 12, and the legs 14.

It will now be appreciated that the skid platform produced by me has all the advantages which are inherent in an all-welded platform, and that it retains the desirable features of a bolted platform in that it permits the ready replacement of the floor boards which may be worn.

Also, my new skid platform allows for the utilization of bolts which will not only hold the wood floor members and upper angle irons 11 in position, but will also assist in the holding of the legs 14 securely in position relatively to the lower angle irons 12 and the skid platform generally. The bolts really add considerably to the rigidity of the structure, greatly increasing its strength over one in which the legs are merely welded. It should also be indicated that because of the utilization of the particular construction, it is possible to use the legs 14 which have the horizontally extended portions 14a which lend themselves to the use of two bolts for each leg and to welding at points 18 and 19.

In Fig. 6, there is shown a simple modification of my invention in which the upper angle irons 11 are flush with the wood floor members 10, rather than placed above the wood floor members 10, as in Fig. 4.

While I have shown and described a particular detailed construction embodying the basic concept of my invention, those skilled in the art will appreciate that many other specific forms of skid platforms embodying the basic concepts of my invention will occur readily to those skilled in the art. I do not wish to be limited in my monopoly except as is necessary in view of the state of the art.

I now claim:

1. In a skid platform, side and end structural members defining the periphery of said skid platform and welded to one another, a series of legs welded to said structural members and forming with said structural members a preformed integral skid platform base unit, certain of said structural members having horizontal flanges on which are adapted to be supported the usual wood boards comprising the skid platform floor, said certain structural members being adapted to be secured to said wood boards and overlying structural steel members resting on the upper surfaces of said floor members by a series of bolts traversing said floor members, said overlying structural steel members and the horizontal flanges of said certain structural members for maintaining said floor members and overlying structural members assembled relatively to said preformed base unit.

2. In a skid platform, side and end structural members defining the periphery of said skid platform and welded to one another, a series of legs having horizontal flanges welded to said structural members and forming with said structural members a preformed integral skid platform base unit, certain of said structural members having horizontal flanges on which are adapted to be supported the usual wood boards comprising the skid platform floor, said certain structural members being adapted to be secured to said wood boards and overlying structural steel members resting on said floor members by a series of bolts traversing said floor members, the horizontal flanges of said legs, said overlying structural steel members and the horizontal flanges of said certain structural members for maintaining said floor members and overlying structural members assembled relatively to said preformed base unit.

GEORGE QUAYLE.